United States Patent [19]

Ljung et al.

[11] 4,425,040

[45] Jan. 10, 1984

[54] RING LASER GYROSCOPE CLUSTER FOR STRAPPED DOWN NAVIGATION

[75] Inventors: Bo H. G. Ljung, Wayne, N.J.; George R. Gamertsfelder, Pleasantville, N.Y.

[73] Assignee: The Singer Company, Little Falls, N.J.

[21] Appl. No.: 229,618

[22] Filed: Jan. 29, 1981

[51] Int. Cl.³ ............................................. G01C 19/64
[52] U.S. Cl. ................................................ 356/350
[58] Field of Search ........................................ 356/350

[56] References Cited

U.S. PATENT DOCUMENTS

| | | | |
|---|---|---|---|
| 3,503,688 | 3/1970 | Lechevalier | 356/350 |
| 4,017,187 | 4/1977 | Schwartz | 356/350 |
| 4,190,364 | 2/1980 | Ljung et al. | 356/350 |
| 4,321,557 | 3/1982 | McNair | 356/350 |

Primary Examiner—Vincent P. McGraw
Attorney, Agent, or Firm—John C. Altmiller; Thomas W. Kennedy

[57] ABSTRACT

An inertial measurement unit using body dithered ring laser gyroscopes in which the individual ring laser gyroscopes are firmly attached to a common dithered structure and provisions made to cancel the reaction moment from the dithered structure by a passive resonator. The stable element, to which both the dithered structure and the passive resonator are attached with torsion springs, also serves as a non-vibrating foundation for strapped down accelerometers. The resulting structure contains fewer parts, has lower fabricating cost and permits a smaller package size than a conventional inertial measurement unit with individually body dithered ring laser gyroscopes.

5 Claims, 9 Drawing Figures

RING LASER GYROSCOPE CLUSTER FOR STRAPPED DOWN NAVIGATION

BACKGROUND OF THE INVENTION

This invention relates to gyroscopes in general and more particularly to an improved ring laser gyroscope cluster.

The conventional inertial measurement unit employing ring laser gyroscopes uses individually body dithered ring laser gyroscopes mounted to a common elastically supported structure, called the stable element. Usually three orthogonally mounted ring laser gyroscopes are used, along with strapped down accelerometers, attached rigidly to the stable element. Analysis shows that the stable element is rotationally vibrated violently about a diagonal axis in space in reaction to the moments imposed on it by the dithered ring laser gyroscopes. The mechanical coupling between the ring laser gyroscopes is so strong as to practically rule out any other dither but phase locked motion. Any other motion would cause the common reaction moment vector to deviate from a fixed space diagonal. If the three strapped down accelerometers are subjected to such a condition, they sense not only the rotational acceleration of about 500 rad/sec$^2$, but also a linear vibrational acceleration that may amount of 5.2 g for a 4 inch offset, both at the dither frequency, typically 250 to 450 Hz. Such simultaneous rotational and linear acceleration is particularly harmful in that it may cause a rectification in the accelerometers that will vary as the offset varies. A changing bias may thus result. For a strapped down accelerometer, a typical specification is bias stability in the order of $5-10^{-6}$ g. This is indeed a difficult problem when the noise to signal ratio is 1,000,000:1.

In order a facilitate a lower noise to signal ratio, the ring laser gyroscopes with individual dither can be phase locked within tight tolerances, and the symmetry of the inertia axis and suspension of the stable element can be closely controlled and adjusted. In addition, the inertia, spring rate and natural frequency of the individual ring laser gyros can be closely controlled and adjusted so that the available torque capacity of each dither motor is not overtaxed. Provided the adjustments are correctly performed, it is then possible to utilize an accelerometer mounting scheme in which only a rotational vibration input is sensed by the strapped down accelerometers. The accelerometers must still perform in this rotational vibration environment. Each ring laser gyroscope must also be statically balanced for linear acceleration inputs at the dither frequency, perpendicular to its input axis, in two mutually perpendicular directions.

Each ring laser gyro also contain electronics, compensating beam combiners, dither suspension and dither drive motors.

SUMMARY OF THE INVENTION

The present invention overcomes the problems noted above by mounting three ring laser gyroscopes orthogonally to a common support, with the common support resiliently mounted to a stable element by means of a stiff torsion spring. The stable element is used as the base for three orthogonally mounted accelerometers. An electromechanical force transducer drives the cluster of ring laser gyroscopes. A case of magnetically soft shielding material surrounds the structure for protection. A passive vibration damper is provided in the form of an inertial body coupled by another stiff torsion spring to the casing, which is, in turn, rigidly coupled to the stable element.

Each of the gyroscopes has a beam combiner of the inexpensive, non-compensating type and a dual output photo detector to detect the beat frequency between CW and CCW beams. Only one of the gyroscopes need have a compensating beam combiner also with a dual output photo detector. The single compensated output is used to derive a correction signal, which is used to correct the outputs of the other two gyroscopes.

The passive vibration damper is tuned to the same resonant frequency as the support on which the three gyroscopes are mounted. The inertia of the inertial body is selected to be approximately 1/10th that of the cluster. This forces the inertial body to operate at an amplitude which is ten times as large as that of the cluster. Typically, this amplitude will be 0.65° the dither of the cluster being selected to be 0.07°. The amplitude is always passively adjusted such that the stable element is at a neutral point. As a result, the accelerometers, which are mounted to the stable element, are not vibrated at all.

The ring laser gyroscope cluster of the present invention offers numerous advantages over separate ring laser gyroscopes. First of all, there are fewer parts making the implementation less expensive. The arrangement allows dither to be removed electrically from the output. The reaction cancelling inertial body acts directly on the cluster. The arrangement is more compact in size and permits common shielding. As a direct result the compact arrangement there is a larger volume for electronics packaging. In addition, this leads to greater freedom in the mounting, which helps deal with thermal problems. Because it is possible to use more common electronics, i.e., electronics common to all three ring laser gyroscopes, there is an additional reduction in size and cost and the mean time between failures is increased. For example, only one high voltage power supply is required. Since all three ring laser gyros are inclined to the vertical in the same way in their orthogonal mounting, they all have essentially the same drift due to air currents.

DETAILED DESCRIPTION OF THE INVENTION

Figure 1:
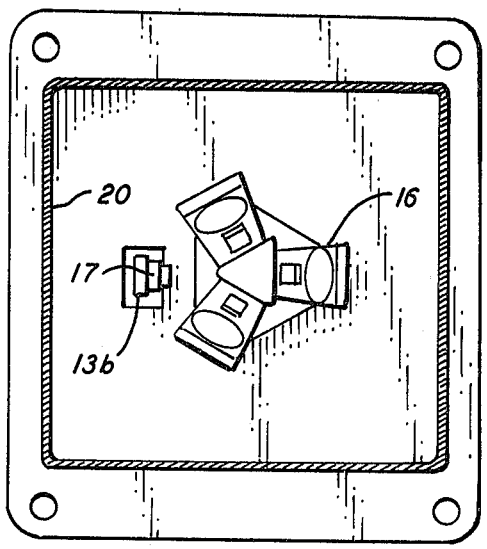
FIG. 1 is a view taken along the line I—I of FIG. 2, showing a bottom view of the stable element and mounting of the accelerometers thereon.
Figure 2:
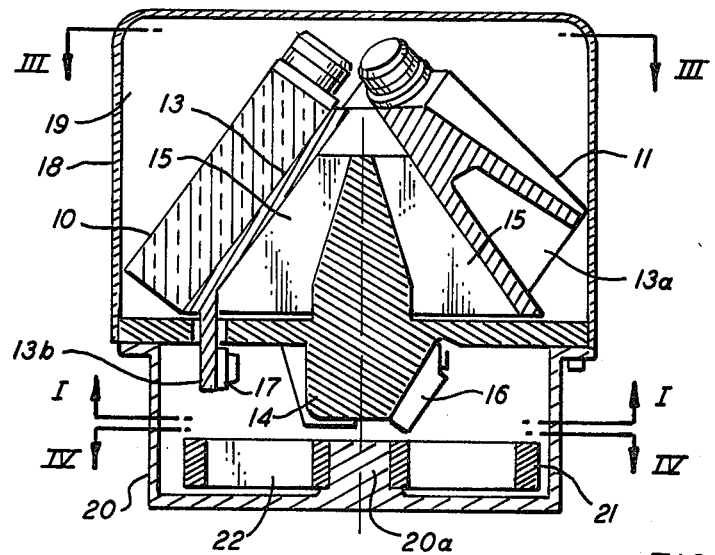
FIG. 2 is a cross-sectional view of the gyroscope of the present invention taken along the lines II—II of FIG. 3.
Figure 3:
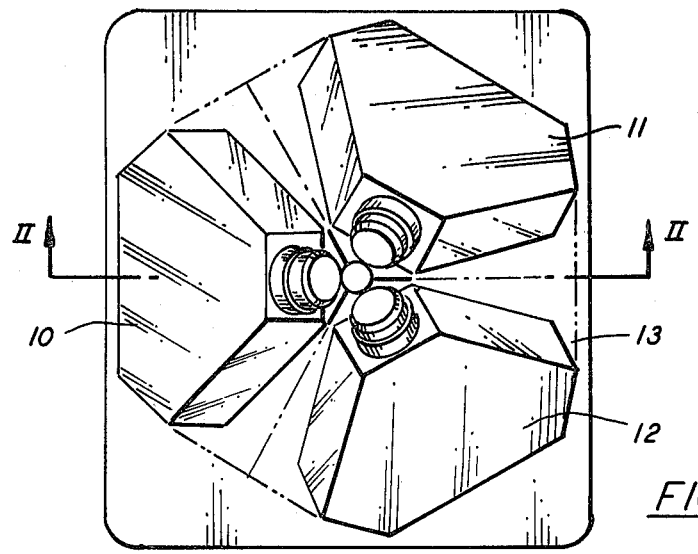
FIG. 3 is a plan view of the gyroscope cluster of the present invention with the magnetic shield removed.

As illustrated by FIGS. 1–3, in accordance with the present invention three ring laser gyroscopes 10, 11 and 12 are orthogonally mounted to a common support 13 forming a cluster. Support 13, shown in cross-section in FIG. 2, has an inside profile which is rotationally symmetrical, in the illustrated embodiment essentially frusto-conical, and an outside profile providing three planar surfaces on which the gyroscopes may be mounted orthogonally. In order to achieve the necessary orthogonal surfaces, the common support 13 must be thicker in certain areas. In order to reduce weight, it contains cutout areas 13a as best seen on FIG. 2. The common support is resiliently mounted to a stable element 14 by means of stiff torsion springs 15, typically made of Invar. These comprise a plurality of planar sheets equally spaced and extending radially between the support element 14 and the inside surface of the common support 13. The common support 13 includes an arm 13b extending downwardly through an appropriate opening 14a in the stable element 14 at which point there is disposed an electromechanical force transducer 17. This provides a means for dithering the cluster. As illustrated by FIGS. 1 and 2, the stable element 14 also serves as a base for three orthogonally mounted accelerometers 16. Enclosing the cluster is a case 18 made of a magnetically soft shielding material for protection. Inside the case 18 is a free volume 19 which may be used to house electronics.

Figure 4:
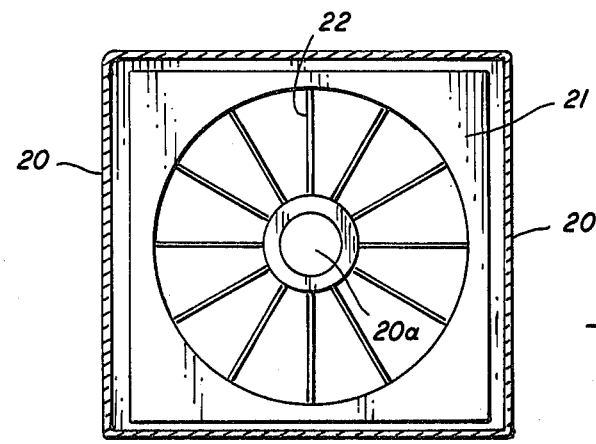
FIG. 4 is a plan view of the passive vibration damper.
Figure 5:
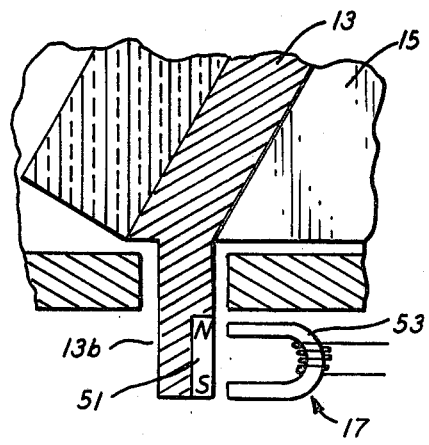
FIGS. 5 and 5a are illustrations of two possible implementations of the electro-mechanical force transducer of FIG. 2.
Figure 5A:
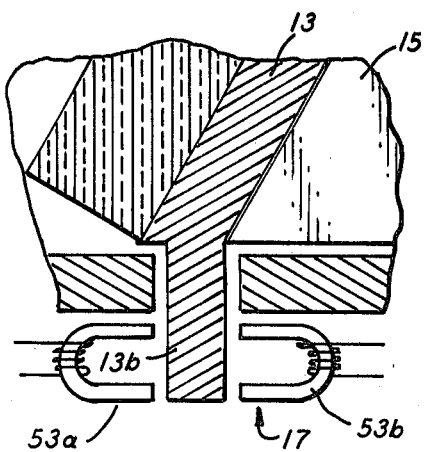

Also included is a bottom case 20, rigidly mounted to the stable element 14, which houses a passive vibration damper. The vibration damper is of simple construction and includes only two parts, an inertial body 21 with a circular inner diameter and in the illustrated embodiment, a rectangular outer shape, and a plurality of stiff torsion springs extending radially between a cylindrical central portion 20a of the case and the circular inner diameter of the inertial body 21, resiliently coupling the inertial body 21 to stable element 14 through case 20. The inertial body 21 is shown in plan view in FIG. 4. Here, the radial torsion springs 22, equally spaced, can be better seen. In operation, the electromechanical force transducer which as shown in FIG. 5 and 5a, is an electromagnetic system is energized to induce a vibration of approximately 0.07°. Referring to FIG. 5, this can be accomplished, for example, where the common support is made of aluminum having the arm 13b contain a magnet 51 disposed opposite an electromagnet 53. By energizing electromagnet 53 at the desired frequency and with the preselected current, the desired angular vibration can easily be induced. As an alternative, the support 13 or at least the arm 13b can be made of a magnetic material, such as iron, and, for example, a pair of electromagnets 53a and 53b operated in a push-pull mode to carry out the necessary vibration as shown by FIG. 5a.

The passive vibration damper is tuned to have a resonant frequency equal to that induced in the support 13 supporting the cluster. By doing so, balanced rotational vibrations occur. The inertia of the inertial body 21 is selected to be approximately 1/10th that of the cluster. The inertial body thus operates at an amplitude of about 0.65°, ten-times larger than that of the support 13. The amplitude is always passively adjusted so that the stable element 14 is at a neutral point. As a result, the accelerometers are not vibrated at all in this mechanization.

Figure 6A:
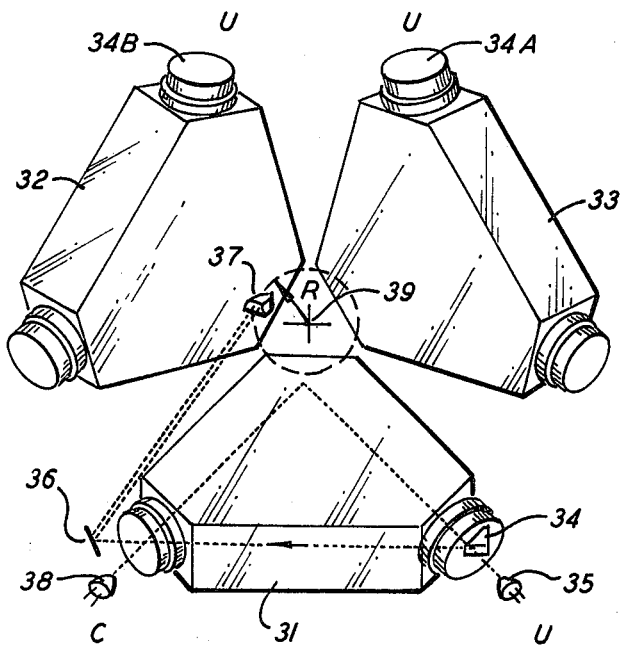
FIGS. 6a and 6b are diagrams illustrating the arrangement of the beam combiners at the outputs of the three ring laser gyroscopes.
Figure 6B:
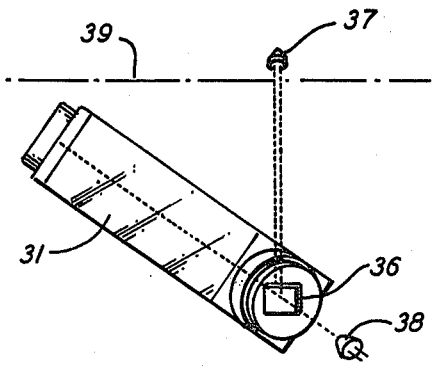
Figure 7:
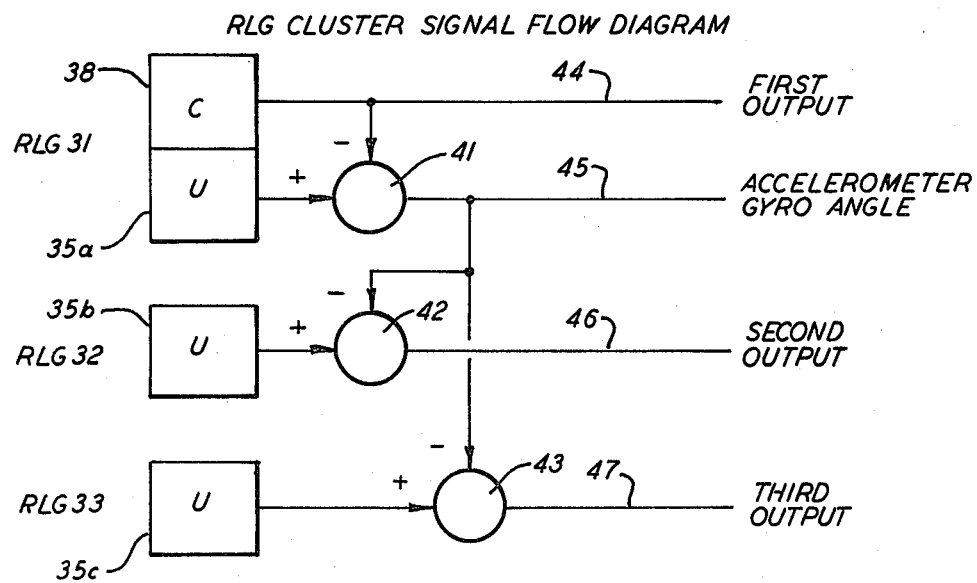
FIG. 7 is a signal flow diagram, illustrating the manner in which the outputs obtained with the arrangement of FIGS. 4A and 4B are utilized to provide compensated outputs.

Referring to FIGS. 6a and 6b, which are respectively plan and side views of the ring laser gyroscope cluster without its supporting structure and including some of the output systems, the manner in which output signals are derived should be apparent. Each of the three gyroscopes 31, 32, and 33, shown in the views of FIGS. 4a and 4b have a beam combiner 34 of the inexpensive, non-compensating type. Each also has a dual output photo detector 35 associated therewith. Only the beam combiner for the gyroscope 31 is shown. In addition, one of the ring laser gyroscopes, gyroscope 31, has a compensating beam combiner comprising a mirror 36, a corner cube retroreflector 37 and a dual output photo detector 38. The corner cube retroreflector 37 is mounted on a radius R from the dither axis 39, radius R chosen such that the output from the external compensating beam combiner exactly cancels the output from the ring laser gyro 31 when the cluster is dithered about axis 39. The outputs of photo detectors 35 are designated on FIG. 7 as 35a, 35b and 35c. The compensated output from the dual photo detector 38 is also illustrated in FIG. 7. The compensated output is obtained from the ring laser gyroscope 31 and is provided as the first output. It is also subtracted from the uncompensated output of gyroscope 31 to give a signal which is both the accelerometer gyro angle and a correction signal for the uncompensated outputs of the other two gyroscopes. Thus, the uncompensated output 35b has subtracted from it the signal on line 45 at a summing junction 42 to provide the second output on line 46. The error is subtracted from the uncompensated output 35c to obtain the third output on line 47.

What is claimed is:

1. A ring laser gyroscope cluster for strapped down navigation comprising:
   a stable element having a dither axis;
   a common support structure having an axis of symmetry coaxial with the dither axis and having a rotationally symmetrical inner surface and having an outer surface adapted for orthogonally mounting first, second and third ring laser gyroscopes;
   first, second and third ring laser gyroscopes mounted to the outside of said support structure and peripherally spaced around the dither axis;
   first spring means mounting said common support structure to said stable element in a resilient manner and symmetrically disposed about the dither axis; and
   electromechanical transducer means for dithering said common support structure relative to said stable element,
   wherein said first, second and third gyroscopes have respectively first, second and third gyroscope axes of symmetry, said three gyroscope axes being peripherally spaced 120 degrees apart, and said three gyroscope axes being arranged to intersect the dither axis at a gyroscope common intersection point disposed axially outwardly of the common support structure, and said three gyroscope axes being disposed at the same angle to the dither axis, for rendering said ring laser gyroscopes insensitive to the differential thermal air currents, and for increasing the sensitivity of the combined output of the ring laser gyroscope cluster, and for ease of manufacture and overhaul of the ring laser gyroscope cluster.

2. The arrangement and means according to claim 1, and further including a passive vibration damper resiliently coupled to said stable element, and wherein said damper comprises an inertial body and second spring means, and second spring means being connected to said inertial body and to said stable element, said inertial body and said second spring means each being symmetrically disposed about the dither axis, and wherein said damper is tuned to the dither frequency and has characteristics such as to cause said stable element to be at a neutral point.

3. The arrangement according to claim 1, and further including first, second and third accelerometers orthogonally mounted to said stable element, whereby said accelerometers will be at a neutral point, and wherein said first, second and third accelerometers have respectively first, second and third accelerometer axes of symmetry, said three accelerometer axes being peripherally spaced 120 degrees apart about the dither axis, and said three accelerometer axes being arranged to intersect the dither axis at an accelerometer common intersection point, and said three accelerometer axes each being disposed at the same angle to the dither axis.

4. The arrangement according to claim 1, and further including:
   non-compensating beam combiners associated with each of said ring laser gyroscopes;
   at least one compensating beam combiner associated with said gyroscopes;
   a dual photo detector associated with each beam combiner for sensing the outputs of said beam combiners; and
   means having as inputs the outputs of said photo detectors and providing three compensated outputs.

5. The arrangement according to claim 4, wherein said means provided comprise:
   (a) a first summing junction having as inputs the outputs of the photo detector associated with the compensated and uncompensated beam combiners of said first gyroscope, said compensated output providing the output for said first gyroscope and the output of said first summing junction providing a correction signal;
   (b) a second summing junction having as inputs said correction signal and the output from the photo detector associated with the uncompensated beam combiner of said second gyroscope, the output of said summing junction being the second gyroscope output; and
   (c) a third summing junction having as inputs the output of the photo detector associated with the uncompensated beam combiner of said third gyroscope and said correction signal and providing at its output, the third gyroscope output.

* * * * *